Sept. 30, 1930.  H. GRAFF  1,777,199
INTERNAL COMBUSTION ENGINE
Filed Nov. 24, 1925
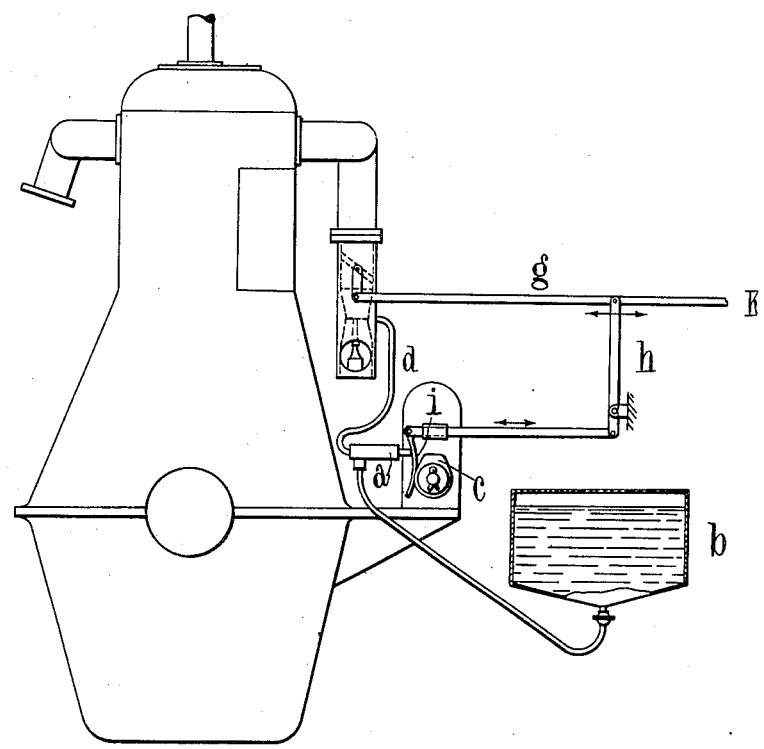
H. Gräff
INVENTOR
By: Marks & Clerk
Attys Patented Sept. 30, 1930

1,777,199

UNITED STATES PATENT OFFICE

HELLMUT GRÄFF, OF BOCHUM, GERMANY, ASSIGNOR TO BENZOL-VERBAND GESELLSCHAFT MIT BESCHRANKTER HAFTUNG, OF BOCHUM, GERMANY

INTERNAL-COMBUSTION ENGINE

Application filed November 24, 1925, Serial No. 71,163, and in Germany November 29, 1924.

This invention relates to the operation of internal combustion engines.

Two difficulties in the operation of low compression internal combustion engines, and more particularly the engines of automobile vehicles, that have hitherto not been overcome are the so-called knocking and carbonizing, that is, the formation of a deposit of carbon in the engine cylinders. The more the mileage per gallon and the economic efficiency is raised by increasing the compression, the worse will be the knocking which is injurious to the bearings. The higher the boiling point of the petrol or other fuels and the more cracked petrols that are used, the more rapidly will carbonizing proceed with a resulting increase in knocking.

It is well known that benzole is less prone to lead to the deposit of carbon and has not the tendency to cause knocking. Unfortunately, the production of benzole is small in proportion to the world's consumption of motor fuels.

It is also known that an addition of water or other substances containing combined oxygen not only improves the combustion, that is, causes the knocking to disappear, but also reduces carbonizing and to some extent effects the removal of carbon already formed. This effect of the water is supposed to be due on the one hand to an internal cooling and on the other hand to the water acting in a similar manner as in the formation of producer gas. The use of water in the form of an emulsion, steam, atomized water and the like has been tried experimentally, pumps being employed for instance for injecting liquid water at a rate varying directly as the speed of the engine, but has not been adopted in practice as it has been found impossible to overcome the practical difficulties. Similarly, the large variety of mixed fuels which have been tried have proved unsuccessful, partly for technical and partly for economic reasons.

Consequently it has hitherto been necessary in internal combustion engines of automobile vehicles to keep the compression and mileage per gallon and efficiency low, as otherwise the high boiling point petrols and the like cause knocking and the excessive or rapid formation of carbon in the cylinders. The development of supercharged engines has been seriously kept back for this reason. Organic amines, tetra-ethyl lead and the like, which have been tried for eliminating knocking only, cannot be used owing to their poisonous nature, high price and to other circumstances.

The present invention is based on the observation that while water is entirely satisfactory both from the economic and technical point of view, it was difficult or impossible with existing arrangements to introduce the "correct" quantity of water at any time by hand or automatically, and that the addition of water or other liquids containing an hydroxyl group must satisfy the following conditions which have hitherto been partly unknown and partly appeared to be impossible of fulfilment.

(1) The liquid containing an hydroxyl group must reach the combustion chamber as such, or at least not wholly as vapour, for the reason that the desirable action of the liquid is partly due to its vaporization within the engine cylinder and to its cooling effect.

(2) At no load or at light loads no liquid or only a very small quantity of liquid should be introduced.

(3) At full load a large quantity must be employed irrespective of whether the speed of revolution is high or low.

(4) At high speeds of revolution the same quantity must be added per power stroke as at low speeds of revolution, and, calculated on the weight of the mixture admission, relatively more of the liquid containing an hydroxyl group must be added at high speeds of revolution.

(5) The addition must be made by positive means so as to prevent any accumulation of water and any delayed spraying which would cause disturbances.

There are many possible ways of satisfying these various conditions.

According to the present invention the desired result may be obtained in a particularly advantageous manner by measuring and injecting the water or other liquid by means of a small piston or other pump which is operated from the engine and by providing means whereby the stroke of the pump is varied by a member of a known kind which is actuated by the throttle mechanism, governor or the like, in such a manner that the pump only commences to deliver when a certain speed of revolution has been reached and thereafter with increase in speed or load the proportion of liquid relative to the combustion mixture admitted is increased.

By varying the stroke of the pump in the manner indicated with a given throttle opening an increase in speed will result in a diminution of the amount of fuel delivered to the engine per working stroke owing to the increase in frictional resistance to the flow of working fluid in the ducts through which it passes to the engine.

For special working conditions the fuel mixtures can be delivered with a suitably altered carburettor or without a carburettor by a pump or by pumps, the proportion of water or other liquid relative to the fuel being controlled in the manner above stated.

The delivered liquids can be delivered either into the usual Venturi-air tubes or at any point into the suction pipe or directly or indirectly into the combustion chamber itself.

One constructional arrangement in accordance with the invention is illustrated by way of example in the accompanying drawing, in which:—

$b$ is the liquid tank from which the liquid is conveyed by the pump $a$ and through the pipe $d$ into the carburettor. The pump is driven from the magneto by means of a cam $c$. The delivery of the pump is varied by the throttle control rods $g$, $h$, $k$, and a rocking lever $i$ whereby the throw of the piston of the pump and the throttle opening are coordinated.

Having now described my invention, what I claim as new and desire to secure by Letters Patent is:—

1. In combination with an internal combustion engine, a source of liquid supply containing an hydroxyl, pumping means connected to said source of supply, means connecting said pump to the combustion chamber of said engine, means actuated by said internal combustion engine for driving said pump, and control means connected to the fuel control of said engine and to said pump whereby the amount of liquid delivered to said combustion chamber is in direct ratio to the quantity of fuel admitted to the engine per power stroke.

2. In combination with an internal combustion engine, a source of liquid supply containing an hydroxyl group, pumping means connected to said source of supply, means connecting said pump to the combustion chamber of said engine, means actuated by said internal combustion engine for driving said pump and control means connected to the fuel control of said engine and to said pump whereby the amount of liquid delivered to said combustion chamber per power stroke of the engine is increased as the power output of the engine is increased and also the proportion of such liquid relatively to the combustible fuel admitted to the combustion chamber per power stroke of the engine is increased in proportion to the increase in speed of operation of the engine.

In testimony whereof I have signed my name to this specification.

HELLMUT GRÄFF.